United States Patent
Zhao (10) Patent No.: US 9,842,389 B2
(45) Date of Patent: *Dec. 12, 2017

(54) LUMINANCE-CHROMINANCE CALIBRATION PRODUCTION LINE OF LED DISPLAY MODULE

(71) Applicant: Xi'an NovaStar Tech Co., Ltd., Xi'an (CN)

(72) Inventor: Xingmei Zhao, Xi'an (CN)

(73) Assignee: XI'AN NOVASTAR TECH CO., LTD., Xi'an (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/585,193

(22) Filed: May 3, 2017

(65) Prior Publication Data

US 2017/0236264 A1    Aug. 17, 2017

Related U.S. Application Data

(60) Division of application No. 14/740,164, filed on Jun. 15, 2015, now Pat. No. 9,672,768, which is a (Continued)

(30) Foreign Application Priority Data

Jun. 24, 2014  (CN) .......................... 2014 1 0289321

(51) Int. Cl.
*G06T 7/00* (2017.01)
*G09G 3/32* (2016.01)
*G06T 7/90* (2017.01)

(52) U.S. Cl.
CPC ................ *G06T 7/001* (2013.01); *G06T 7/90* (2017.01); *G09G 3/32* (2013.01); *G06T 2207/10024* (2013.01); *G09G 2320/0693* (2013.01)

(58) Field of Classification Search
None
See application file for complete search history.

(56) References Cited

U.S. PATENT DOCUMENTS

| 6,611,249 B1* | 8/2003 | Evanicky .................. G01J 3/02 |
| | | 345/102 |
| 7,969,478 B1* | 6/2011 | Chen ........................ H04N 5/58 |
| | | 348/223.1 |

(Continued)

OTHER PUBLICATIONS

Ezio, How a Screen is Manufactured and Assembled, Jun. 30, 2010.*

*Primary Examiner* — Hilina K Demeter
(74) *Attorney, Agent, or Firm* — Hemisphere Law, PLLC (57) ABSTRACT

A luminance-chrominance calibration production line system includes: a rail; multiple stations disposed along the rail and including multiple first darkroom stations; multiple image acquisition apparatuses respectively disposed in the first darkroom stations and for capturing different color images sequentially displayed by a to-be-calibrated LED display module loaded on the rail to acquire color image data; and a rail computer system for controlling a transport movement on the rail and controlling the to-be-calibrated LED display module to display the different color images, and being signally connected to the image acquisition apparatuses to obtain the color image data. By using multiple image acquisition apparatuses to collect various color image information of LED display module in pipelined manner, calibration efficiency is improved, data collection is accurate, data collection error caused by using different image acquisition apparatuses to calibrate different LED display modules is avoided and calibration manpower is reduced.

10 Claims, 5 Drawing Sheets

Related U.S. Application Data continuation of application No. PCT/CN2015/070715, filed on Jan. 14, 2015.

(56) References Cited

U.S. PATENT DOCUMENTS

| | | | | |
|---|---|---|---|---|
| 2003/0231161 | A1* | 12/2003 | Yamaguchi | G09G 3/3406 345/102 |
| 2004/0246274 | A1* | 12/2004 | Rykowski | G09G 5/06 345/690 |
| 2006/0227085 | A1* | 10/2006 | Boldt, Jr. | G09G 3/32 345/83 |
| 2007/0132790 | A1* | 6/2007 | Miller | G09G 5/06 345/690 |
| 2008/0036797 | A1* | 2/2008 | Whang | G09G 3/006 345/698 |
| 2010/0309016 | A1* | 12/2010 | Wendt | H05B 37/029 340/12.51 |
| 2012/0229526 | A1* | 9/2012 | Holmes | G06F 3/14 345/690 |
| 2012/0320042 | A1* | 12/2012 | Green | G01J 3/506 345/419 |

* cited by examiner

LUMINANCE-CHROMINANCE CALIBRATION PRODUCTION LINE OF LED DISPLAY MODULE

CROSS-REFERENCE TO RELATED APPLICATIONS

This application is a divisional application of U.S. patent application Ser. No. 14/740,164, filed on Jun. 15, 2015, which is a continuation of PCT International Application No. PCT/CN2015/070715, filed on Jan. 14, 2015, which claims the priority of Chinese Patent Application No. 201410289321.8, filed on Jun. 24, 2014, the disclosure of which is incorporated herein by reference in its entirety.

FIELD OF THE INVENTION

The invention relates to the field of display correction/calibration technology, and more particularly to a luminance-chrominance calibration production line of LED (light emitting diode) display module.

BACKGROUND OF THE INVENTION

With the development of LED display industry, the LED display screens are widely used in more and more occasions such as advertisement, traffic, dispatch center, shows and rally. However, these display screens more or less have the problem of non-uniform display such as mosaic caused by deviation/difference of luminance and/or chrominance between LED dots, and thus it is necessary to calibrate each LED dot with the help of image acquisition apparatus so as to make the displays of the LED display screens are as smooth as mirror.

A LED cabinet calibration generally is carried out in the factory, and thus the cost of manpower and material is relatively small. Nowadays, display screen manufacturers tend to adopt the cabinet calibration, this is because the cabinet calibration can make the LED display be uniform before leaving the factory and can save the manpower compared with the on-site calibration. The cabinet calibration can significantly improve the luminance and chrominance evenness/uniformity in each cabinet and between cabinets, and eliminate a bright/dark line in each cabinet as well as a splicing bright/dark line between cabinets, and thus can guarantee the display uniformity when all the LED cabinets are assembled randomly on site.

With dramatic increase of orders of the LED display screen manufacturers, higher efficiency is needed by the LED display screen manufacturers for cabinet calibration before leaving the factory. However, the existing cabinet calibration is time-consuming and requires a lot of labor, and therefore it is difficult to meet the requirements of a large number of shipments for the display screen manufacturers.

Figure 1:
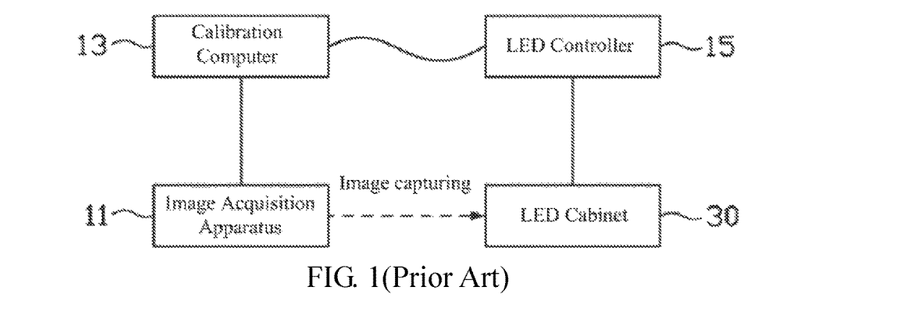
FIG. 1 is a schematic view of an architecture for a conventional luminance-chrominance calibration of LED cabinet in the factory.

FIG. 1 is a conventional architecture for luminance and chrominance calibration of LED cabinet (or termed as cabinet calibration) in the factory and including an image acquisition apparatus 11 (such as a camera), a calibration computer 13, a LED controller 15 and a to-be-calibrated LED cabinet 30. A concrete luminance-chrominance calibration process is that: (a) manually placing the LED cabinet 30 onto a preset position and connecting the LED cabinet 30 to the LED controller 15 and the calibration computer 13; (b) using the calibration computer 13 to control the LED controller 15 to sequentially play red, green and blue color images and to control the image acquisition apparatus 11 to sequentially collect luminance and chrominance information of the red, green and blue color images; (c) the calibration computer 13 calculates luminance and chrominance information of red, green and blue LED dots according to the collected luminance and chrominance information and generates calibration coefficients of corresponding LED dots; (d) using the LED controller 15 to upload the calibration coefficients to the LED cabinet 30 for storing; and (e) then the luminance-chrominance calibration of the LED cabinet 30 is finished; and after that, manually removing the calibration-finished LED cabinet 30, placing next LED cabinet to the preset position and repeating the above steps (a), (b), (c) and (d).

From the foregoing discussion, it can be understood that in the conventional LED cabinet calibration method in the factory, the LED cabinet is manually placed onto the preset position, if the placed position and the preset position have an offset existed therebetween, which will affect the data acquisition/collection for the LED cabinet; moreover, it cannot perform image acquisition simultaneously to multiple LED cabinets; and in addition, it needs two persons for carrying the cabinet and one calibration operation person, the co-working of three persons leads to the manual calibration being time-consuming.

SUMMARY OF THE INVENTION

Accordingly, in order to overcome the technical drawbacks in the prior art, the invention provides a luminance-chrominance calibration production line of LED display module.

Specifically, a luminance-chrominance calibration production line of LED display module according to an embodiment of the invention includes: a rail; a plurality of stations, disposed along the rail and including a plurality of first darkroom stations; a plurality of image acquisition apparatuses, respectively disposed in the plurality of first darkroom stations and respectively configured (i.e., structured and arranged) for capturing different color images sequentially displayed by a to-be-calibrated LED display module loaded on the rail so as to acquire color image data; and a rail computer system, configured for controlling a transport movement on the rail and controlling the to-be-calibrated LED display module to display the different color images, and being signally connected with the plurality of image acquisition apparatus to obtain the color image data.

In an embodiment of the invention, the plurality of stations further include a warming up station set disposed before the plurality of first darkroom stations.

In an embodiment of the invention, the plurality of stations further include a calibration coefficient uploading and storing station set disposed after the plurality of first darkroom stations.

In an embodiment of the invention, the luminance-chrominance calibration production line of LED display module further includes a luminance-chrominance meter, the plurality of stations further include a second darkroom station, the luminance-chrominance meter is disposed in the second darkroom station and signally connected with the rail computer system, the second darkroom station is disposed before or after the plurality of first darkroom stations.

In an embodiment of the invention, the plurality of stations further include a warming up station set disposed before the plurality of first darkroom stations and the second darkroom station.

In an embodiment of the invention, the plurality of stations further include a calibration coefficient uploading and storing station set disposed after the plurality of first darkroom stations and the second darkroom station.

In an embodiment of the invention, the luminance-chrominance calibration production line of LED display module further includes a darkroom computer, the rail computer system is signally connected with the luminance-chrominance meter via the darkroom computer.

In an embodiment of the invention, the luminance-chrominance calibration production line of LED display module further includes a plurality of luminance-chrominance meters, the plurality of luminance-chrominance meters are respectively disposed in the plurality of first darkroom stations and signally connected with the rail computer system.

In an embodiment of the invention, the luminance-chrominance calibration production line of LED display module further includes a plurality of darkroom computers, the rail computer system is signally connected with the plurality of image acquisition apparatuses via the plurality of darkroom computers respectively.

As described above, the various embodiments of the invention uses a plurality of image acquisition apparatuses to respectively collect various color image information of a LED display module in a pipelined manner (one image acquisition apparatus only collects one type color image information), that is, for example, for a RGB three-color full color LED display module, it can perform data collection/acquisition simultaneously to three LED display modules, the calibration efficiency can be increased to at least three times, and the calibration efficiency of LED display module is improved. Moreover, the invention can relieve even eliminate the inaccurate data collection/acquisition caused by the LED display module being not manually placed onto the preset position accurately, and therefore the data acquisition is more accurate. Since one image acquisition apparatus only is used to capture one color, which can avoid the data acquisition error occurred in the situation of different image acquisition apparatuses being used for calibrating different LED display modules. In addition, since the invention is an automatic production line, which can reduce the calibration manpower.

By the following detailed description with reference to accompanying drawings, other aspects and features of the invention will become apparent. However, it should be understood that, the drawings only are for the purpose of explanation and not as limiting the scope of the invention, and the scope of the invention should refer to the appended claims. It also be appreciated that, unless otherwise indicated, the drawings are not necessarily drawn to scale, they are merely trying to conceptually illustrate the structures and procedures described herein.

DETAILED DESCRIPTION OF PREFERRINGRED EMBODIMENTS

In order to make the above objectives, features and advantages of the invention be more apparent, concrete embodiments of the invention will be described below in detail with reference to the accompanying drawings.

Figure 2:
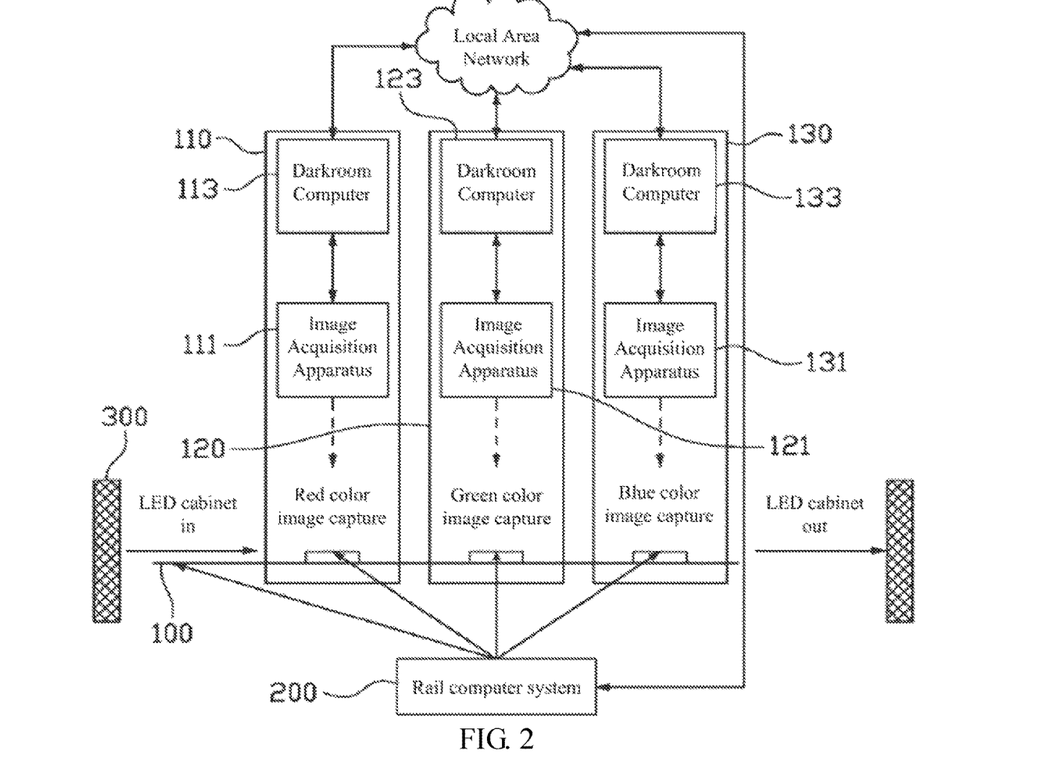
FIG. 2 is a schematic view of a systematic architecture of a luminance-chrominance calibration production line of LED display module according to an embodiment of the invention.

Referring to FIG. 2, a systematic architecture of a luminance-chrominance calibration production line of LED display module according to an embodiment of the invention is shown. As illustrated in FIG. 2, the luminance-chrominance calibration production line of LED display module includes: a rail 100; a plurality of darkroom stations 110, 120, 130 disposed along the rail 100; image acquisition apparatuses 111, 121, 131; darkroom computers 113, 123, 133; and a rail computer system 200.

The image acquisition apparatuses 111, 121, 131 respectively are disposed in the darkroom stations 110, 120, 130. The darkroom computers 113, 123, 133 respectively are signally connected with the image acquisition apparatuses 111, 121, 131 in the respective darkroom stations 110, 120, 130. The darkroom computers 113, 123, 133 are signally connected with the rail computer system 200 via a local area network. The image acquisition apparatuses 111, 121, 131 are subjected to the control of the rail computer system 200 via the respective darkroom computers 113, 123, 133, and configured for capturing different color images sequentially displayed by a to-be-calibrated LED display module e.g., LED cabinet 300 loaded on the rail 100 and for uploading color image data obtained after the capturing, via the respective darkroom computers 113, 123, 133, to the rail computer system 200 for analyzing and processing and thereby generating calibration coefficients, e.g., luminance and chrominance calibration coefficients for the LED cabinet 300.

A luminance-chrominance calibration process associated with the calibration production line of LED display module according to this embodiment of the invention will be described below in detail with reference to FIG. 2.

(x1) a LED display module such as LED cabinet 300 is loaded on the rail 100, the rail computer system 200 controls the rail 100 to start for transporting, and after the LED cabinet 300 enters the darkroom station 110, the rail 100 is stopped from transporting.

(x2) in the darkroom station 110, the rail computer system 200 controls the LED cabinet 300 to display a red color image and further controls the image acquisition apparatus 111 via the local area network and the darkroom computer 113 to start capturing the red color image displayed by the LED cabinet 300 so as to collect red color image information of the LED cabinet 300; after the capturing of red color image, waiting for the rail computer system 200 to start the rail 100 for transporting, and after the LED cabinet 300 enters the darkroom station 120, the rail 100 is stopped from transporting.

(x3) in the darkroom station 120, the rail computer system 200 controls the LED cabinet 300 to display a green color image and further controls the image acquisition apparatus 121 via the local area network and the darkroom computer 123 to start capturing the green color image displayed by the LED cabinet 300 so as to collect green color image information of the LED cabinet 300; after the capturing of green color image, waiting for the rail computer system 200 to start the rail 100 for transporting, and after the LED cabinet 300 enters the darkroom station 130, the rail 100 is stopped from transporting.

(x4) in the darkroom station 130, the rail computer system 200 controls the LED cabinet 300 to display a blue color image and further controls the image acquisition apparatus 131 via the local area network and the darkroom computer 133 to start capturing the green color image displayed by the LED cabinet 300 so as to collect blue color image information of the LED cabinet 300; after the capturing of blue color image, waiting for the rail computer system 200 to start the rail 100 for transporting the LED cabinet 300 backwardly.

After obtaining multiple types of color image information of the LED cabinet 300 via the above steps (x2) to (x4), calculating, uploading and storing of calibration coefficients for the LED cabinet 300 will be performed, and during the calculating, uploading and storing of calibration coefficients, the rail 100 continues to perform image acquisition operation to next LED cabinet. It should be understood that, the luminance-chrominance calibration of the LED cabinet 300 in this embodiment of the invention adopts the production line pipeline operation, when the current LED cabinet is being performed with the step (x3), the next LED cabinet is being performed with the step (x2), that is, there are multiple (i.e., more than one) LED cabinets are performed with the image acquisition operation simultaneously.

Figure 3:
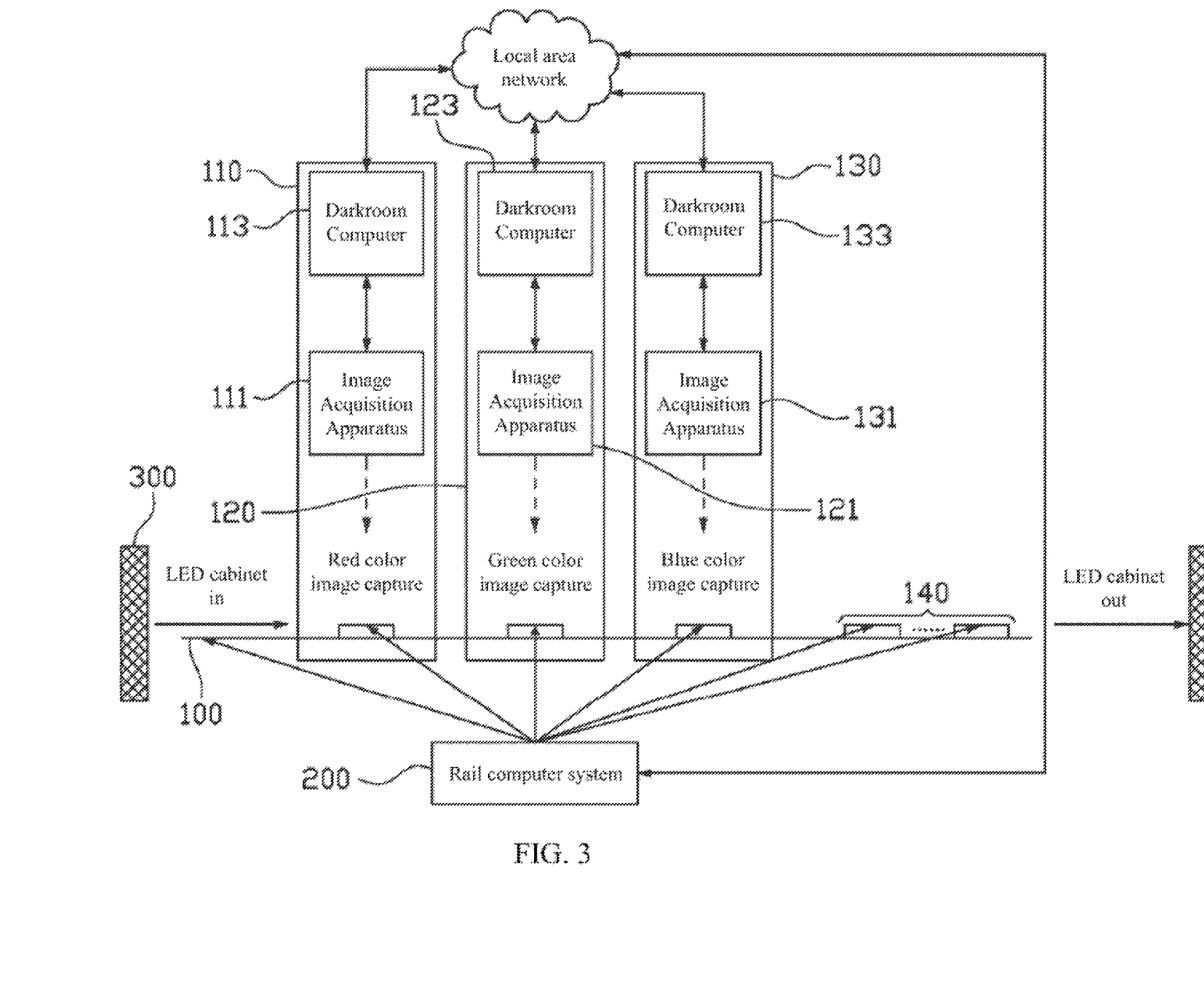
FIG. 3 is a schematic view of a systematic architecture of a luminance-chrominance calibration production line of LED display module according to another embodiment of the invention.

Moreover, since the calculating, uploading and storing of calibration coefficients do not require darkroom, it may dispose N number of stations as a calibration coefficient uploading and storing station set 140 (as shown in FIG. 3) for calculating, uploading and storing the calibration coefficients for the LED cabinet 300. The calculating of calibration coefficients and the uploading of calibration coefficients can use the same one computer for controlling image acquisition in the rail computer system 200, or use another computer in the rail computer system 200; in other words, the rail computer system 200 may be one computer, or a combination of multiple computers. A calculating method of the station number N in the uploading and storing station set 140 may be that: if a time of calculating the calibration coefficients is 1 second, a time of uploading the calibration coefficients is 30 seconds, a time of storing is 10 seconds, a transport time between adjacent stations is 2 seconds, and times of red, green and blue image acquisition respectively are 10 seconds, then a=(1+30+10)/(2+10)=3.4, N needs to take the smallest integer greater than or equal to a, that is, N=4. In addition, it should be understood that, the embodiment illustrated in FIG. 3 performs the calculating, uploading and storing of calibration coefficients for the LED cabinet in on-line manner, but the invention is not limited to this, it may be that moving the LED cabinet out of the production line after finishing the image acquisition to the LED cabinet and then performing the calculating, uploading and storing of calibration coefficients in off-line manner.

Figure 4:
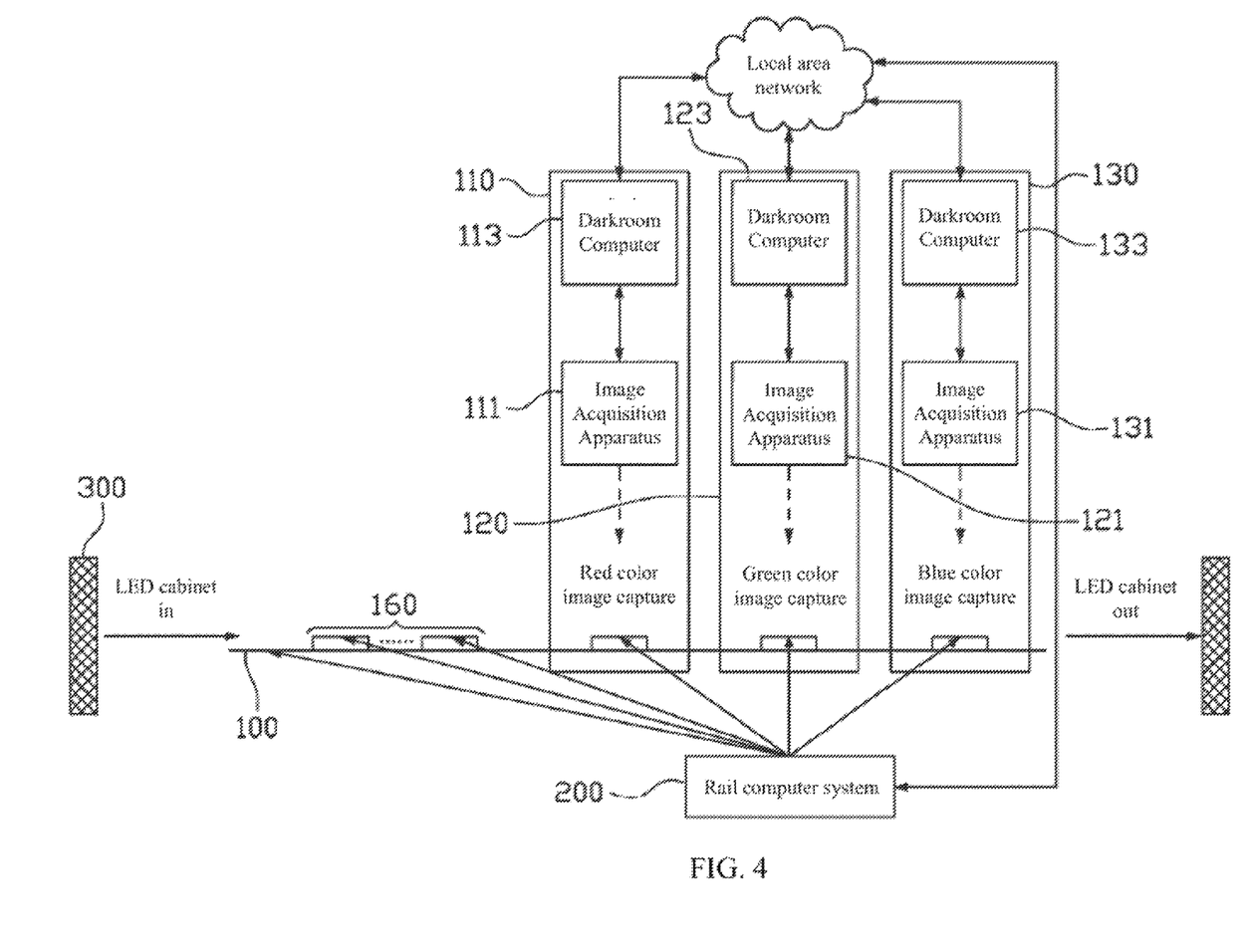
FIG. 4 is a schematic view of a systematic architecture of a luminance-chrominance calibration production line of LED display module according to further another embodiment of the invention.

In another embodiment, as illustrated in FIG. 4, before the LED cabinet 300 enters the darkroom station 110, multiple positions are disposed on the rail 100 for placing LED cabinets to be warmed up, that is, a warming up station set 160 is disposed on the rail 100. This is because the brightnesses of LED dots just being lit up are unstable, so that the brightness of the LED cabinet just being lit up and the brightness of the LED cabinet after being warmed up for a period of time are different from each other. If performing the data acquisition for the LED cabinet just being lit up, it could not obtain the true brightness distribution. In this embodiment, LED cabinets loaded on the warming up station set 160 are controlled to be lit up by the rail computer system 200. A calculating method of the station number M for the LED cabinet warming up station set 160 may be that: if one LED cabinet needs to be warmed up with 3 minutes, i.e., 3×60=180 seconds, a transport time between neighboring stations is 2 seconds, and times for red, green and blue image acquisition respectively are 10 seconds, the warming up station number M needed before the LED cabinet entering the darkroom station 110 is 3*60/(10+2)=15, which can assure each LED cabinet has the same warming up time.

In the above embodiments, for each of the steps (x2), (x3) and (x4), a time length from the LED cabinet 300 entering the darkroom station to the rail being started for transporting is a fixed time T, and the T is determined by the longest one of the operation times in the darkroom station 110, the darkroom station 120 and the darkroom station 130. It is assumed that the longest one of the times for red, green and blue image acquisitions is 10 seconds, the T may be set as 10 seconds.

It is noted that, the luminance-chrominance calibration production line of LED display module according to the above embodiments mainly is applied to single lot/batch LED cabinet calibration and non-absolute-value-correction calibration. When a calibration target value of LED cabinet adopts an absolute-value-correction calibration, or it is needed to record original luminance and chrominance information of LED cabinet, or performing multi-batch LED cabinet calibration, a luminance-chrominance meter(s) preferably is/are equipped, for example the embodiments associated with FIGS. 5 and 6.

Figure 5:
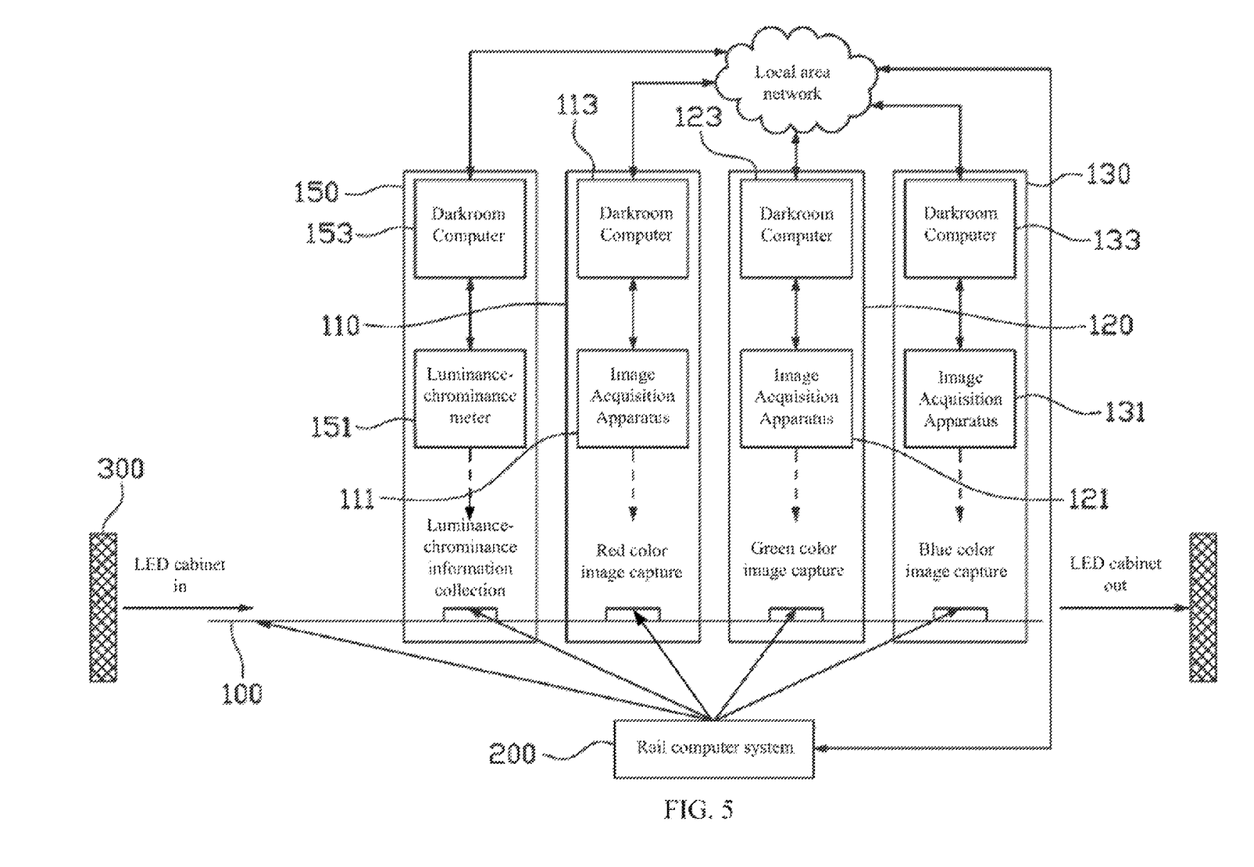
FIG. 5 is a schematic view of a systematic architecture of a luminance-chrominance calibration production line of LED display module according to still another embodiment of the invention.

Referring to FIG. 5, a systematic architecture of a luminance-chrominance calibration production line of LED cabinet according to still another embodiment of the invention is shown. As illustrated in FIG. 5, the luminance-chrominance calibration production line of LED display module includes: a rail 100; a plurality of darkroom stations 110, 120, 130, 150 disposed along the rail 100; image acquisition apparatuses 111, 121, 131; a luminance-chrominance meter 151; darkroom computers 113, 123, 133, 153; and a rail computer system 200.

The image acquisition apparatuses 111, 121, 131 respectively are disposed in the darkroom stations 110, 120, 130. The darkroom computers 113, 123, 133 respectively are signally connected with the image acquisition apparatuses 111, 121, 131 in the respective darkroom stations 110, 120, 130. The luminance-chrominance meter 151 e.g., a light gun is disposed in the darkroom station 150, and the darkroom computer 153 is signally connected with the luminance-chrominance meter 151 disposed in the darkroom station 150. The darkroom computers 113, 123, 133, 153 are signally connected to the rail computer system 200 via a local area network. The image acquisition apparatuses 111, 121, 131 are subjected to the control of the rail computer system 200 via respective darkroom computers 113, 123, 133 and configured for capturing different color images sequentially displayed by a to-be-calibrated LED display module e.g., a LED cabinet 300 loaded on the rail 100 and uploading color image data obtained after the capturing to the rail computer system 200 via the respective darkroom computers 113, 123, 133. The luminance-chrominance meter 151 is subjected to the control of the rail computer system 200 via the darkroom computer 153 and configured for collecting absolute luminance and chrominance information of color images displayed by the to-be-calibrated LED display module e.g., LED cabinet 300 loaded on the rail 100.

A luminance-chrominance calibration process associated with the calibration production line of LED display module according to this embodiment of the invention will be described below in detail with reference to FIG. 5.

(y1) a LED display module e.g., LED cabinet 300 is loaded on the rail 100, the rail computer system 200 controls the rail 100 to start for transporting, and after the LED cabinet 300 enters the darkroom station 150, the rail 100 is stopped from transporting.

(y2) in the darkroom station 150, the rail computer system 200 controls the LED cabinet 300 to sequentially display multiple (i.e., more than one) color images, e.g., for a RGB three-color full color LED cabinet, it is controlled to sequentially display red, green and blue color images, and the display order of the color images is not limited herein. In addition, the rail computer system 200 controls the luminance-chrominance meter 151 to collect absolute luminance and chrominance information of the LED cabinet 300 via the local area network and the darkroom computer 153, and the collected absolute luminance and chrominance information is uploaded to the rail computer system 200 via the darkroom computer 153 and the local area network. After collecting the absolute luminance and chrominance information, the rail computer system 200 starts the rail 100 for transporting, and after the LED cabinet 300 enters the darkroom station 110, the rail 100 is stopped from transporting.

(y3) in the darkroom station 110, the rail computer system 200 controls the LED cabinet 300 to display a red color image and further controls the image acquisition apparatus 111 via the local area network and the darkroom computer 113 to start capturing the red color image displayed on the LED cabinet 300 so as to collect red color image information of the LED cabinet 300. After the capturing of red color image, waiting for the rail computer system 200 to start the rail 100 for transporting, and after the LED cabinet 300 enters the darkroom station 120, the rail 100 is stopped from transporting.

(y4) in the darkroom station 120, the rail computer system 200 controls the LED cabinet 300 to display a green color image and further controls the image acquisition apparatus 121 to start capturing the green color image displayed on the LED cabinet 300 via the local area network and the darkroom computer 123 so as to collect green color image information of the LED cabinet 300. After the capturing of green color image, waiting for the rail computer system 200 to start the rail 100 for transporting, and after the LED cabinet 300 enters the darkroom station 130, the rail 100 is stopped from transporting.

(y5) in the darkroom station 130, the rail computer system 200 controls the LED cabinet 300 to display a blue color image and further controls the image acquisition apparatus 131 to start capturing the blue color image displayed on the LED cabinet 300 via the local area network and the darkroom computer 131 so as to collect blue color image information of the LED cabinet 300. After the capturing of blue color image, waiting for the rail computer system 200 to start the rail 100 for transporting so as to transport the LED cabinet 300 backwardly.

After obtaining the luminance and chrominance information of the LED cabinet 300 by the above steps (y2) to (y5), luminance and chrominance differences among the three image acquisition apparatuses 111, 121, 131 e.g., cameras are used to restore luminance and chrominance data of the LED cabinet 300, and then calculating, uploading and storing of calibration coefficients for the LED cabinet 300 are carried out.

Figure 6:
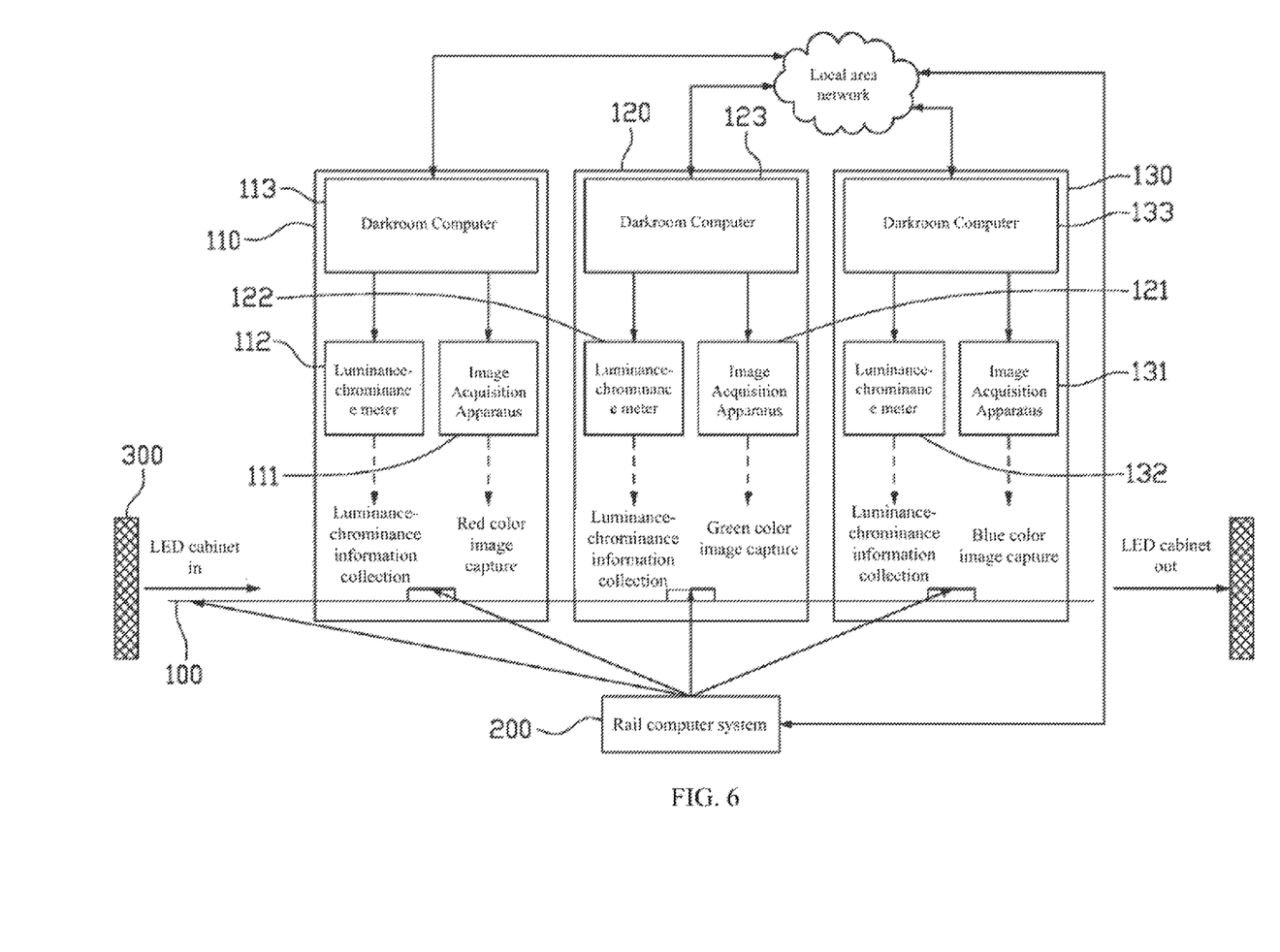
FIG. 6 is a schematic view of a systematic architecture of a luminance-chrominance calibration production line of LED display module according to even still another embodiment of the invention.

In other embodiment, for example the embodiment as illustrated in FIG. 6, which is different from the illustration of FIG. 5 that the luminance-chrominance meter 151 is disposed in an individual darkroom station 150. As illustrated in FIG. 6, multiple luminance-chrominance meters 112, 122, 132 are disposed, and the luminance-chrominance meters 112, 122, 132 respectively are arranged in the darkroom stations 110, 120, 130. That is, the luminance-chrominance meter 112 and the image acquisition apparatus 111 both are disposed in the same darkroom station 110 and signally connected with the darkroom computer 113, the luminance-chrominance meter 122 and the image acquisition apparatus 121 both are disposed in the same darkroom station 120 and signally connected with the darkroom computer 123, the luminance-chrominance meter 132 and the image acquisition apparatus 131 both are disposed in the same darkroom station 130 and signally connected with the darkroom computer 133. Correspondingly, the above step (y2) is not carried out, and in the above steps (y3) to (y5) for capturing the red, green and blue color images, the luminance-chrominance meters 112, 122, 132 respectively are used to collect absolute luminance and chrominance information of the red, green and blue color images.

It should be understood that, in the embodiments as illustrated in FIGS. 5 and 6, like the illustrations of FIGS. 3 and 4, a warming up station set (referring to 160 in FIG. 4) is disposed before the multiple darkroom stations 150, 110, 120, 130, and/or a calibration coefficient uploading and storing station set (referring to 140 in FIG. 3) is disposed after the multiple darkroom stations 150, 110, 120, 130.

In addition, in the above embodiments of the invention, the displaying order of the red, green and blue color images is not limited, and may be any displaying order. Moreover, for a red-green or red-blue two-color LED cabinet, the number of the darkroom stations 110, 120, 130 for image acquisition can be reduced to two, and for a four-color or more than four color LED cabinet, the number of the darkroom stations for image acquisition can be increased correspondingly. Furthermore, the darkroom stations may not be disposed with the darkroom computers, and the image acquisition apparatuses and/or the luminance-chrominance meter(s) are/is directly connected to the rail computer system 200 via the local area network. It is noted that, the LED display module mentioned in the above embodiments of the invention is not limited to the LED cabinet, it may be a LED display unit board or a LED display screen; it is well-known to the skilled person in the art that one LED cabinet typically includes one or more than one LED display unit boards and a display control card (e.g., receiving card or named as scanning board), and one LED display screen includes one or more than one LED cabinets. In the above embodiments of the invention, the image capturing of the multiple image acquisition apparatuses and/or the luminance and chrominance information collecting of the luminance-chrominance meter(s) can be automatically carried out subjected to the control of the rail computer system 200, or are carried out by production line workers manually operating the darkroom computers.

In summary, the various embodiments of the invention uses a plurality of image acquisition apparatuses to respectively collect various color image information of a LED display module in a pipelined manner (one image acquisition apparatus only collects one type color image information), that is, for example, for a RGB three-color full color LED display module, it can perform data collection/acquisition simultaneously to three LED display modules, the calibration efficiency can be increased to at least three times, and the calibration efficiency of LED display module is increased. Moreover, the invention can relieve even eliminate the inaccurate data collection/acquisition caused by the LED display module being not manually placed onto the preset position accurately, and therefore the data acquisition is more accurate. Since one image acquisition apparatus only is used to capture one color, which can avoid the data acquisition error occurred in the situation of different image acquisition apparatuses being used for calibrating different LED display modules. In addition, since the invention is an automatic production line, which can reduce the calibration manpower.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

INDUSTRIAL APPLICABILITY

The various embodiments of the invention uses a plurality of image acquisition apparatuses to respectively collect various color image information of a LED display module in a pipelined manner (one image acquisition apparatus only collects one type color image information), that is, for example, for a RGB three-color full color LED display module, it can perform data collection/acquisition simultaneously to three LED display modules, the calibration efficiency can be increased to at least three times, and the calibration efficiency of LED display module is increased. Moreover, the invention can relieve even eliminate the inaccurate data collection/acquisition caused by the LED display module being not manually placed onto the preset position accurately, and therefore the data acquisition is more accurate. Since one image acquisition apparatus only is used to capture one color, which can avoid the data acquisition error occurred in the situation of different image acquisition apparatuses being used for calibrating different LED display modules. In addition, since the invention is an automatic production line, which can reduce the calibration manpower.

What is claimed is:

1. A luminance-chrominance calibration production line system of LED display module, comprises:
   a rail;
   a plurality of stations, disposed along the rail and comprising a plurality of first darkroom stations;
   a plurality of image acquisition apparatuses, respectively disposed in the plurality of first darkroom stations and configured for capturing different color images sequentially displayed by a to-be-calibrated LED display module loaded on the rail so as to acquire color image data; and
   a rail computer system, configured for controlling a transport movement on the rail and for controlling the to-be-calibrated LED display module to display the different color images, and being signally connected with the plurality of image acquisition apparatuses to obtain the color image data;
   wherein the plurality of stations further comprise a calibration coefficient uploading and storing station set disposed after the plurality of first darkroom stations, a number of calibration coefficient uploading and storing stations in the calibration coefficient uploading and storing station set is determined by a time of calculating calibration coefficients of the to-be-calibrated LED display module, a time of uploading the calibration coefficients, a time of storing the calibration coefficients, a transport time between adjacent calibration coefficient uploading and storing stations and an image capturing time.

2. The luminance-chrominance calibration production line system of LED display module according to claim 1, wherein the plurality of stations further comprise a warming up station set disposed before the plurality of first darkroom stations.

3. The luminance-chrominance calibration production line system of LED display module according to claim 1, wherein the rail computer system, is configured for using luminance and chrominance differences among the plurality of image acquisition apparatuses to restore the color image data of the to-be-calibrated LED display module.

4. The luminance-chrominance calibration production line system of LED display module according to claim 1, further comprising a luminance-chrominance meter; wherein the plurality of stations further comprise a second darkroom station, the luminance-chrominance meter is disposed in the second darkroom station and signally connected with the rail computer system, the second darkroom station is disposed before or after the plurality of first darkroom stations; the to-be-calibrated LED display module is controlled by the rail computer system to sequentially display a plurality of different color images in the second darkroom station so as to collect absolute luminance and chrominance information of the to-be-calibrated LED display module by the luminance-chrominance meter.

5. The luminance-chrominance calibration production line system of LED display module according to claim 4, wherein the plurality of stations further comprise a warming up station set disposed before the plurality of the first darkroom stations and the second darkroom station.

6. The luminance-chrominance calibration production line system of LED display module according to claim 4, further comprising a darkroom computer; wherein the rail computer system is signally connected with the luminance-chrominance meter via the darkroom computer.

7. The luminance-chrominance calibration production line system of LED display module according to claim 1, further comprising a plurality of luminance-chrominance meters; wherein the plurality of luminance-chrominance meters respectively are disposed in the plurality of first darkroom stations and all signally connected to the rail computer system.

8. The luminance-chrominance calibration production line system of LED display module according to claim 1, further comprising a plurality of darkroom computers; wherein the rail computer system is signally connected with the plurality of image acquisition apparatuses via the plurality of darkroom computers respectively.

9. The luminance-chrominance calibration production line system of LED display module according to claim 1, wherein the different color images comprises a red color image, a green color image and a blue color image.

10. The luminance-chrominance calibration production line system of LED display module according to claim 1, wherein the to-be-calibrated LED display module is a LED cabinet comprising one or more than one LED display unit boards and a display control card signally connected therewith.

* * * * *